(12) United States Patent
Saito et al.

(10) Patent No.: US 12,243,693 B2
(45) Date of Patent: Mar. 4, 2025

(54) ELECTROLYTIC CAPACITOR, METHOD FOR MANUFACTURING SAME, AND ELECTROLYTIC CAPACITOR MODULE

(71) Applicant: Panasonic Intellectual Property Management Co., Ltd., Osaka (JP)

(72) Inventors: Kazuyo Saito, Osaka (JP); Yuichiro Tsubaki, Kyoto (JP); Tatsuji Aoyama, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 77 days.

(21) Appl. No.: 17/810,619

(22) Filed: Jul. 4, 2022

(65) Prior Publication Data

US 2022/0351913 A1    Nov. 3, 2022

Related U.S. Application Data

(63) Continuation of application No. PCT/JP2021/001954, filed on Jan. 21, 2021.

(30) Foreign Application Priority Data

Jan. 24, 2020 (JP) .................. 2020-010386

(51) Int. Cl.
*H01G 9/035* (2006.01)
*H01G 9/10* (2006.01)
*H01G 9/145* (2006.01)
*H01G 9/00* (2006.01)

(52) U.S. Cl.
CPC .............. *H01G 9/035* (2013.01); *H01G 9/10* (2013.01); *H01G 9/145* (2013.01); *H01G 9/0029* (2013.01)

(58) Field of Classification Search
None
See application file for complete search history.

(56) References Cited

U.S. PATENT DOCUMENTS

| 6,128,179 A * | 10/2000 | Morokuma ............. H01G 9/10 29/25.03 |
| 2015/0287540 A1 | 10/2015 | Koseki et al. |
| 2017/0148582 A1* | 5/2017 | Matsuura ............... H01G 9/055 |
| 2018/0090279 A1* | 3/2018 | Tsubaki ................. H01G 9/145 |

(Continued)

FOREIGN PATENT DOCUMENTS

| JP | 2000-294458 | 10/2000 |
| JP | 2014-123685 | 7/2014 |

(Continued)

OTHER PUBLICATIONS

International Search Report of PCT application No. PCT/JP2021/001954 dated Apr. 20, 2021.

*Primary Examiner* — Eric W Thomas
(74) *Attorney, Agent, or Firm* — Rimon P.C.

(57) ABSTRACT

An electrolytic capacitor includes a capacitor element and a liquid component. The capacitor element includes an anode body that includes a dielectric layer on a surface of the anode body and a conductive polymer that covers a part of the dielectric layer. The liquid component includes a sugar alcohol component and a polyalkylene glycol component. The sugar alcohol component contains at least one selected from the group consisting of a sugar alcohol having four or more hydroxy groups and a derivative of the sugar alcohol.

13 Claims, 2 Drawing Sheets

(56) References Cited

U.S. PATENT DOCUMENTS

2018/0277312 A1\*  9/2018  Tsubaki ................. H01G 11/80
2020/0227208 A1\*  7/2020  Tsubaki ................. H01G 9/035

FOREIGN PATENT DOCUMENTS

| JP | 2017-081871 A | 5/2017 | |
|---|---|---|---|
| JP | 2018-110233 | 7/2018 | |
| JP | 2019-029498 | 2/2019 | |
| JP | 6535409 B | 6/2019 | |
| WO | 2017/094242 | 6/2017 | |
| WO | WO-2019076611 A1 * | 4/2019 | ............. H01G 11/48 |

\* cited by examiner

FIG. 1

FIG. 2

ELECTROLYTIC CAPACITOR, METHOD FOR MANUFACTURING SAME, AND ELECTROLYTIC CAPACITOR MODULE

BACKGROUND

1. Technical Field

The present disclosure relates to an electrolytic capacitor, a method for manufacturing the electrolytic capacitor, and an electrolytic capacitor module.

2. Description of the Related Art

As a small-sized, large-capacitance capacitor having a low equivalent series resistance (ESR), a promising candidate is considered to be an electrolytic capacitor including an anode body having a dielectric layer formed thereon, a conductive polymer covering at least a part of the dielectric layer, and an electrolytic solution. As the electrolytic solution, a liquid component such as a non-aqueous solvent or a solution obtained by dissolving a solute in a non-aqueous solvent is used.

Unexamined Japanese Patent Publication No. 2018-110233 has proposed that an electrolytic solution containing a tetra- or higher valent sugar alcohol derivative is used in a solid electrolytic capacitor.

Unexamined Japanese Patent Publication No. 2014-123685 has proposed that an electrolytic solution containing ethylene glycol is filled in a gap portion in a capacitor element having a solid electrolyte layer, which contains sorbitol or sorbitol and a polyhydric alcohol, formed on the capacitor element. The electrolytic solution may contain sorbitol.

Japanese Patent No. 6535409 has proposed the following manufacturing method of a solid electrolytic capacitor. The manufacturing method includes: a first introduction step of introducing a dispersion liquid including a particulate conductive polymer compound and a first water-soluble compound into a capacitor element; and a second introduction step of introducing a water-soluble polymer solution including liquid polyethylene glycol, water, and a second water-soluble compound so as to surround a solid electrolyte layer formed in the first introduction step. A water-soluble polymer solution not including a particulate conductive polymer compound is used in the second introduction step, and the same substance as the first water-soluble compound is used as the second water-soluble compound. The first water-soluble compound is diglycerin, a compound having a molecular weight of 100 or more and less than 200 and four or more hydroxyl groups, or both thereof.

SUMMARY

An electrolytic capacitor according to an aspect of the present disclosure includes a capacitor element and a liquid component. The capacitor element includes an anode body that includes a dielectric layer on a surface of the anode body, and a conductive polymer that covers a part of the dielectric layer. The liquid component includes a sugar alcohol component and a polyalkylene glycol component. The sugar alcohol component contains at least one selected from the group consisting of a sugar alcohol having four or more hydroxy groups and a derivative of the sugar alcohol.

An electrolytic capacitor according to another aspect of the present disclosure includes a plurality of electrolytic capacitors which are connected in parallel. The plurality of electrolytic capacitors includes the above-described electrolytic capacitor.

A method for manufacturing an electrolytic capacitor according to still another aspect of the present disclosure is a method for manufacturing an electrolytic capacitor including a capacitor element and a liquid component. The capacitor element includes an anode body including (i) a dielectric layer on a surface of the anode body and (ii) a conductive polymer covering a part of the dielectric layer. The method includes: a step of preparing a liquid component that includes a sugar alcohol component and a polyalkylene glycol component; a conductive polymer impregnating step of impregnating the dielectric layer with the conductive polymer; and a liquid component impregnating step of impregnating the capacitor element with the liquid component after the conductive polymer impregnating step. The sugar alcohol component contains at least one selected from the group consisting of a sugar alcohol having four or more hydroxy groups and a derivative of the sugar alcohol.

An electrolytic capacitor and an electrolytic capacitor module that are excellent in heat resistance can be provided.

DETAILED DESCRIPTIONS OF EMBODIMENTS

An electrolytic capacitor may be used in a high-temperature environment depending on use applications, and thus high heat resistance is required.

When an electrolytic capacitor that includes a liquid component including a non-aqueous solvent is used in a high-temperature environment, the non-aqueous solvent is likely to evaporate, and sufficient durability is difficult to obtain. Thus, it is preferable to use a liquid component including a non-aqueous solvent having a relatively high boiling point. However, when the boiling point of the non-aqueous solvent is high, the viscosity of the liquid component may increase, and thus it may be difficult to impregnate the capacitor element with the liquid component. When such a non-aqueous solvent is used, dissociability of the solute may decrease, and thus it may be difficult to secure the characteristics of the electrolytic capacitor. When the length of linked carbon atoms in the molecular chain of the non-aqueous solvent increases, the affinity with an elastic polymer contained in a sealing body increases, and thus the sealing body is easily swollen by the non-aqueous solvent. When the electrolytic capacitor in which the sealing body is swollen by the non-aqueous solvent is exposed to a high-temperature environment, deterioration of the sealing body progresses, and durability decreases. In the related art, various non-aqueous solvents have been mentioned as the non-aqueous solvent used for the liquid component of the electrolytic capacitor, but it is very difficult to obtain a liquid component excellent in the balance of characteristics as described above.

In an electrolytic capacitor of an aspect of the present disclosure, a liquid component including a sugar alcohol component and a polyalkylene glycol component is used in an electrolytic capacitor that includes a capacitor element including a conductive polymer. The sugar alcohol component contains at least one selected from the group consisting of a sugar alcohol having four or more hydroxy groups and a derivative thereof. Since such a sugar alcohol component has low solubility to a non-aqueous solvent although it has high hydrophilicity, it was difficult for such a sugar alcohol component to actually use for the liquid component of the electrolytic capacitor. However, when such a sugar alcohol component is used in combination with the polyalkylene glycol component, the sugar alcohol component can be easily dissolved so that high dissociability of the solute can be secured, and the viscosity of the liquid component can be suppressed relatively low. Hence, the sugar alcohol component can be used as the liquid component of the electrolytic capacitor. Furthermore, since the liquid component includes the sugar alcohol component, it is difficult for the liquid component to volatilize even in a high-temperature environment and to swell the sealing body. Thus, high heat resistance of the electrolytic capacitor can be secured. As compared with glycerin or the like, a sugar alcohol having four or more hydroxy groups or a derivative thereof can enhance the orientation of the conductive polymer included in the capacitor element, thereby enhancing the conductivity of the conductive polymer. In general, when a component having a large amount of hydroxy groups is used as the liquid component, the liquid component easily permeates the sealing body. However, when the sugar alcohol component as described above is used, a large amount of the sugar alcohol component remains in the liquid component even in a high-temperature environment, so that high-temperature environment orientation of the conductive polymer can be maintained.

Hereinafter, the configuration of the electrolytic capacitor and a method for manufacturing the electrolytic capacitor will be described in more detail.

[Electrolytic Capacitor]

The electrolytic capacitor includes a capacitor element and a liquid component. The electrolytic capacitor usually includes a container that houses the capacitor element and the liquid component and a sealing body that seals the container.

(Liquid Component)

(Sugar Alcohol Component)

The sugar alcohol component contains at least one selected from the group consisting of a sugar alcohol having four or more hydroxy groups and a derivative thereof (hereinafter, referred to as the first sugar alcohol component in some cases). The sugar alcohol component may contain a sugar alcohol component (second sugar alcohol component) other than the first sugar alcohol component. From the viewpoint of easily securing the effect of the sugar alcohol component, the proportion of the first sugar alcohol component in the sugar alcohol component is preferably 50 mass % or more, and may be 75 mass % or more or 90 mass % or more. The sugar alcohol component may contain only the first sugar alcohol component.

Examples of the sugar alcohol having four or more hydroxy groups (hereinafter, referred to as the first sugar alcohol in some cases) include monosaccharide alcohol and disaccharide alcohol. Examples of the first sugar alcohol include sorbitol, mannitol, erythritol, pentaerythritol, threitol, arabinitol, ribitol, xylitol, galactitol, rhamnitol, isomaltose, maltitol, lactitol, palatinose, and reductants thereof (for example, reduced palatinose).

The number of hydroxy groups of the first sugar alcohol may be, for example, 10 or less or 8 or less.

The number of hydroxy groups of the derivative of the first sugar alcohol is not particularly limited. The derivative may not have a hydroxy group, and may have more hydroxy groups than the corresponding first sugar alcohol. The number of hydroxy groups of the derivative may range, for example, from 0 to 10, from 0 to 8, from 1 to 8, or from 2 to 8. Examples of the derivative include an ester in which at least a part of hydroxy groups of the first sugar alcohol is esterified, and an alkylene oxide adduct of the first sugar alcohol. Examples of the ester include organic acid esters (such as acetylated sugar alcohols). More specific examples of the alkylene oxide adduct include an adduct in which one molecule of alkylene oxide is added to one hydroxy group for at least a part of hydroxy groups. Examples of the alkylene oxide include $C_{2-4}$ alkylene oxide, and $C_{2-3}$ alkylene oxide or ethylene oxide is preferred. When the alkylene oxide adduct includes a plurality of alkylene oxide units, at least two alkylene oxide units may be of the same type, or all the alkylene oxide units may be of different type.

The liquid component may include one kind of first sugar alcohol component, or may include two or more kinds of first sugar alcohol components. From the viewpoint of easily orienting the conductive polymer, it is preferable to use a first sugar alcohol component having a hydroxy group at each of at least two carbon atoms adjacent to each other. The first sugar alcohol component is preferably mannitol, sorbitol, erythritol, pentaerythritol, derivatives thereof, and the like. The derivative is preferably an alkylene oxide adduct. These first sugar alcohol components easily swell the conductive polymer and easily orient the conductive polymer. Thus, the film restoration effect of the dielectric layer can be enhanced, and the ESR can be reduced.

Examples of the second sugar alcohol component include tritol or a derivative thereof. Examples of the tritol include glycerin. Examples of the derivative include an ester in which at least a part of hydroxy groups of tritol is esterified, an adduct in which an alkylene oxide is added to at least a part of hydroxy groups of tritol, and polyglycerin or a derivative thereof. Although polyglycerin or a derivative thereof is not generally classified as a sugar alcohol, in the present specification, these components are collectively referred to as the second sugar alcohol component for convenience. Examples of the polyglycerin include those in which the number of repetitions of glycerin ranges from 2 to 12, inclusive. Examples of the derivative of polyglycerin include an ester in which at least a part of hydroxy groups is esterified, and an adduct in which an alkylene oxide is added to at least a part of hydroxy groups. As for the ester and the alkylene oxide adduct, the description of the derivative of the first sugar alcohol can be referred to. The liquid component may include one or two or more kinds of second sugar alcohol components.

The content proportion of the sugar alcohol component in the liquid component is, for example, 5 mass % or more, and may be 10 mass % or more, 15 mass % or more, 20 mass % or more, 25 mass % or more, or 30 mass % or more. When the content proportion of the sugar alcohol component is in such a range, it is easy to swell the conductive polymer and to enhance the orientation of the conductive polymer. When content ratios of the other components are relatively decreased, the effect of suppressing swelling of the sealing body due to the liquid component is enhanced. The content proportion of the sugar alcohol component in the liquid component is preferably 70 mass % or less and more preferably 50 mass % or less, and may be 40 mass % or less, 35 mass % or less, or 30 mass % or less. When the content proportion of the sugar alcohol component is in such a range, the viscosity of the liquid component can be low, and thus high dissociability of the solute is easily secured. These lower and upper limit values of the range in the content proportion of the sugar alcohol component can be arbitrarily combined.

(Polyalkylene Glycol Component)

The polyalkylene glycol component may be any component having a repeated structure of alkylene oxide. Examples of the alkylene oxide include $C_{2-4}$ alkylene oxide, and the alkylene oxide may be $C_{2-3}$ alkylene oxide. Specific examples of the alkylene oxide include ethylene oxide, propylene oxide, trimethylene oxide, and butylene oxide. The polyalkylene glycol component may include one kind of alkylene oxide unit or may include two or more kinds of alkylene oxide units. The polyalkylene glycol component including two or more kinds of alkylene oxide units may include, for example, an ethylene oxide unit and a $C_{3-4}$ alkylene oxide unit. When the polyalkylene glycol component including two or more kinds of alkylene oxide units is used, the effect of reducing the viscosity of the liquid component is enhanced.

Examples of the polyalkylene glycol component include polyalkylene glycol, a copolymer including two or more kinds of alkylene oxide units, and a polyalkylene oxide adduct of a polyhydric alcohol. Examples of the polyhydric alcohol include glycerin, trimethylolpropane, and sugar alcohols exemplified for the first sugar alcohol. In the polyalkylene oxide adduct, two or more polyalkylene oxide chains may be the same polyalkylene oxide chain, or all the polyalkylene oxide chains may be different.

The liquid component may include one kind of polyalkylene glycol component, or may include two or more kinds of polyalkylene glycol components.

The weight average molecular weight (Mw) of the polyalkylene glycol component is, for example, 150 or more, and preferably 200 or more. When the Mw is in such a range, the sugar alcohol component is easily dissolved, and the viscosity of the liquid component can be low although the liquid component includes the sugar alcohol component. The effect of suppressing volatilization of the liquid component can be enhanced. The Mw is, for example, 3000 or less, and may be 2000 or less or 1000 or less, or may be 800 or less or 600 or less. When the Mw is in such a range, the viscosity of the liquid component can be further suppressed. These lower and upper limit values of the range in the Mw of the polyalkylene glycol component can be arbitrarily combined.

In the present specification, a weight average molecular weight (Mw) is a value in terms of polystyrene as measured by gel permeation chromatography (GPC). Usually, GPC is measured using a polystyrene gel column and water/methanol (volume ratio: 8/2) that form a mobile phase.

The content proportion of the polyalkylene glycol component in the liquid component is, for example, 30 mass % or more, and is preferably 50 mass % or more, 60 mass % or more, 65 mass % or more, or 70 mass % or more. In this case, the solubility of the sugar alcohol component can be enhanced, and the viscosity of the liquid component can be low even though the liquid component includes the sugar alcohol component. The content proportion of the polyalkylene glycol component in the liquid component is, for example, 95 mass % or less and preferably 90 mass % or less, and may be 85 mass % or less, 80 mass % or less, 75 mass % or less, 70 mass % or less, 60 mass % or less, or 50 mass % or less. In this case, even when the electrolytic capacitor is used in a high-temperature environment, swelling of the sealing body due to the liquid component can be more effectively suppressed. These lower and upper limit values of the range in the content proportion of the polyalkylene glycol component can be arbitrarily combined.

The content proportion of the polyalkylene glycol component in the liquid component is preferably greater than the content proportion of the sugar alcohol component in the liquid component. As a result, the sugar alcohol component is easily dissolved, and high dissociability of the solute in the liquid component is easily secured, so that the film restoration effect of the dielectric layer can be enhanced.

(Non-Aqueous Solvent)

The liquid component may include a non-aqueous solvent other than the sugar alcohol component and the polyalkylene glycol component. Examples of the non-aqueous solvent include a sulfone compound, a lactone compound, a carbonate compound, and a polyhydric alcohol other than the sugar alcohol component and the polyalkylene glycol component.

Examples of the sulfone compound include sulfolane, dimethyl sulfoxide, and diethyl sulfoxide. Examples of the lactone compound include γ-butyrolactone and γ-valerolactone. Examples of the carbonate compound include dimethyl carbonate, diethyl carbonate, ethyl methyl carbonate, ethylene carbonate, propylene carbonate, and fluoroethylene carbonate. Examples of the polyhydric alcohol include alkylene glycol (such as ethylene glycol or propylene glycol), and trimethylolpropane.

The liquid component may include one or two or more kinds of non-aqueous solvents.

From the viewpoint of enhancing the effect of suppressing swelling of the sealing body due to the liquid component, the content proportion of such a non-aqueous solvent in the liquid component is preferably 10 mass % or less, and more preferably 5 mass % or less or 1 mass % or less.

(Solute)

The liquid component may include a solute. Examples of the solute include an acid component and a base component. The liquid component preferably includes at least an acid component. When a conductive polymer component contains a dopant, the acid component in the electrolytic solution suppresses the dedoping phenomenon of the dopant and stabilizes conductivity of each polymer component. Even when the dopant is dedoped from the conductive polymer component, the acid component of the electrolytic solution is again doped at a site from which the dopant have been dedoped, and thus low ESR is likely to be maintained. The electrolytic solution may contain a base component together with an acid component. At least a part of the acid component is neutralized by the base component. This enables corrosion of an electrode due to the acid component to be suppressed while the acid component is increased in concentration.

Examples of the acid component include carboxylic acid, sulfur-containing acids (such as sulfuric acid and sulfonic acid), boron-containing acids (such as boric acid, halogenated boric acid (such as tetrafluoroboric acid), or partial esters thereof), phosphorus-containing acids (phosphoric acid, halogenated phosphoric acid (such as hexafluorophosphoric acid), phosphonic acid, phosphinic acid, or partial esters thereof), nitric acid, and nitrous acid. As the acid component, a condensate of a carboxylic acid and an inorganic acid (such as boric acid or phosphoric acid) may be used. The liquid component may include one or two or more kinds of acid components.

The acid component is preferably at least one of carboxylic acid, sulfonic acid, a condensate of carboxylic acid and an inorganic acid, or the like. Examples of the sulfonic acid include aliphatic sulfonic acid having 1 to 30 carbon atoms and aromatic sulfonic acid having 6 to 30 carbon numbers. Examples of the carboxylic acid include aliphatic carboxylic acid and aromatic carboxylic acid. Among them, aromatic carboxylic acid is relatively stable. A polycarboxylic acid having two or more hydroxy groups is also preferred. Specifically, phthalic acid, pyromellitic acid, and the like may be used as the aromatic carboxylic acid. Of them, phthalic acid is preferred.

The condensate of carboxylic acid and an inorganic acid is preferably a condensate of carboxylic acid and a boric acid. Specifically, as such a condensate, borodisalicylic acid, borodiglycolic acid, borodioxalic acid, and the like may be used.

Examples of the base component include ammonia, amine (specifically, primary amine, secondary amine, or tertiary amine), a quaternary ammonium compound, and an amidinium compound. The liquid component may include one or two or more kinds of base components.

The amine may be any of aliphatic, aromatic, and heterocyclic. Examples of the amine include methyl amine, dimethyl amine, trimethyl amine, ethyl amine, diethyl amine, triethyl amine, ethylene diamine, N,N-diisopropylethyl amine, tetramethylethylene diamine, hexamethylene diamine, spermidine, spermine, amantadine, aniline, phenethylamine, toluidine, pyrrolidine, piperidine, piperazine, morpholine, imidazole, pyridine, pyridazine, pyrimidine, pyrazine, and 4-dimethylaminopyridine. Examples of the quaternary ammonium compound include amidine compounds (also including imidazole compounds).

The liquid component may include the acid component and the base component in a free state or in a salt form, respectively. The liquid component may include an organic salt. Examples of the organic salt include those in which at least one of the acid component and the base component is organic. Examples of the organic salt include trimethylamine maleate, triethylamine phthalate, ethyldimethylamine phthalate, mono 1,2,3,4-tetramethylimidazolinium phthalate, mono 1,3-dimethyl-2 ethylimidazolinium phthalate, and triethylamine borodisalicylate.

The pH of the liquid component is preferably 4 or less, and may be 3.8 or less or 3.6 or less. When the pH of the electrolytic solution is set in such a range, deterioration of the conductive polymer component is easily suppressed. The pH is preferably 1.0 or more.

The concentration of the solute in the liquid component is, for example, 0.1 mass % or more, and is preferably 0.5 mass % or more. When the concentration of the solute is in such a range, by using the sugar alcohol component and the polyalkylene glycol component in combination, the solute can be dissociated in the liquid component with high dissociability, and high film restoration properties of the dielectric layer can be secured. The concentration of the solute is preferably 25 mass % or less and more preferably 15 mass % or less. When the concentration of the solute is in such a range, dedoping of the dopant can be suppressed. These lower and upper limit values of the range in the concentration of the solute can be arbitrarily combined.

(Others)

The content proportion of water in the liquid component may be less than 1.5 mass % or 1 mass % or less, is preferably less than 0.5 mass %, and may be 0.1 mass % or less or 0.01 mass % or less. The sugar alcohol component generally has high solubility to water, but when the sugar alcohol component is used in combination with the polyalkylene glycol component, the sugar alcohol component is easily dissolved in the polyalkylene glycol component by heating even when the content proportion of water in the liquid component is small. Although the sugar alcohol component has high crystallinity, crystallization of the sugar alcohol component is suppressed once the sugar alcohol component is dissolved in the polyalkylene glycol component. The content proportion of water is a content proportion in the liquid component of the electrolytic capacitor in the initial state.

Although the liquid component including the sugar alcohol component tends to have a relatively higher viscosity at 20° C., the sugar alcohol component can be dissolved in the polyalkylene glycol component by heating when the liquid component is used in combination with the polyalkylene glycol component. The viscosity at 20° C. of the liquid component is, for example, 200 mPa·s or more, and may be 500 mPa·s or more. Even when the viscosity at 20° C. of the liquid component is in such a range, the viscosity can be reduced by heating. Hence, the conductive polymer of the capacitor element can be easily impregnated with the liquid component, high film restoration properties of the dielectric layer is easily secured, and high conductivity can be easily secured by the conductive polymer being oriented.

In the present specification, the viscosity of the liquid component can be measured using a vibration type viscometer. As the vibration type viscometer, for example, a vibration type viscometer VM-100A manufactured by CBC Co., Ltd. is used.

(Capacitor Element)

The capacitor element includes at least an anode body that includes a dielectric layer on a surface of the anode body and a conductive polymer that covers a part of the dielectric layer.

(Anode Body)

The anode body may contain a valve metal, an alloy containing a valve metal, a compound containing a valve metal, or the like. These materials can be used singly or in combination of two or more kinds thereof. As the valve metal, for example, aluminum, tantalum, niobium, and titanium are preferably used. The anode body having a porous surface can be obtained, for example, by roughening a surface of a base material (such as a foil-shaped or plate-shaped base material) containing a valve metal by etching or the like. The anode body may be a molded body of particles that contain a valve metal or a sintered body of the molded body. The sintered body has a porous structure.

(Dielectric Layer)

The dielectric layer is formed by anodizing the valve metal of the surface of the anode body by an anodizing treatment or the like. It is sufficient that the dielectric layer is formed so as to cover at least a part of the anode body. Usually, the dielectric layer is formed on the surface of the anode body. Since the dielectric layer is formed on the porous surface of the anode body, the dielectric layer is formed along inner wall surfaces of holes and hollows (pits) in the surface of the anode body.

The dielectric layer contains an oxide of a valve metal. For example, when tantalum is used as the valve metal, the dielectric layer contains $Ta_2O_5$, and when aluminum is used as the valve metal, the dielectric layer contains $Al_2O_3$. The dielectric layer is not limited thereto, and any dielectric layer may be used as long as the dielectric layer functions as a dielectric body. When a surface of the anode body is porous, the dielectric layer is formed along the surface of the anode body (including inner wall faces of holes).

(Conductive Polymer Layer)

The conductive polymer is attached to cover a part of the dielectric layer so as to form a conductive polymer layer.

The conductive polymer constitutes at least a part of the cathode body in the electrolytic capacitor. The conductive polymer layer may further contain at least one of a dopant and an additive, as necessary.

Examples of the conductive polymer include polypyrrole, polythiophene, polyfuran, polyaniline, polyacetylene, polyphenylene, polyphenylene vinylene, polyacene, and polythiophene vinylene. These may be used singly or in combination of two or more kinds thereof, or may be a copolymer of two or more kinds of monomers.

In the present specification, polypyrrole, polythiophene, polyfuran, polyaniline, and the like mean polymers having, as a basic skeleton, polypyrrole, polythiophene, polyfuran, polyaniline, and the like, respectively. Thus, polypyrrole, polythiophene, polyfuran, polyaniline, and the like each can also include its derivative. For example, polythiophene includes poly(3,4-ethylenedioxythiophene) and the like.

The dopant may be a polyanion. Specific examples of the polyanion include polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. These may be used singly or in a combination of two or more kinds thereof. These may be a polymer of a single monomer or a copolymer of two or more kinds of monomers. Among them, a polyanion derived from polystyrenesulfonic acid is preferred.

The conductive polymer layer can be formed, for example, by chemically and/or electrolytically polymerizing a raw material monomer on the dielectric layer. Alternatively, the conductive polymer layer can be formed by bringing a solution in which the conductive polymer is dissolved or a dispersion liquid in which the conductive polymer is dispersed into contact with the dielectric layer. The conductive polymer layer may be formed to cover at least a part of the dielectric layer.

A metal foil may also be used for the cathode body as well as the anode body. The type of the metal is not particularly limited, but it is preferable to use a valve metal such as aluminum, tantalum, or niobium or an alloy containing the valve metal. A surface of the metal foil may be roughened as necessary. On the surface of the metal foil, an anodization film, a film of a metal different from the metal that constitutes the metal foil (different type of metal), or a nonmetal film may be provided. Examples of the different type of metal and the nonmetal include metals such as titanium and nonmetals such as carbon.

(Separator)

When a metal foil is used for the cathode body, a separator may be disposed between the metal foil and the anode body. The separator is not particularly limited. For example, it is possible to use an unwoven fabric including fibers of cellulose, polyethylene terephthalate, vinylon, or polyamide (for example, aliphatic polyamide or aromatic polyamide such as aramid).

(Others)

The electrolytic capacitor may be a wound type, or may be either a chip type or a laminated type. The configuration of the capacitor element may be selected in accordance with the type of the electrolytic capacitor.

(Container)

As a material for the container, for example, a metal such as aluminum, stainless steel, copper, iron, or brass, or an alloy thereof can be used. The shape of the container is not particularly limited as long as the container can house the capacitor element and the liquid component.

(Sealing Body)

The sealing body is not particularly limited as long as the sealing body seals the opening of the container. The sealing body usually contains an elastic polymer. The sealing body may further contain a crosslinking agent that crosslinks the elastic polymer, an additive, and the like.

As the elastic polymer, an insulating material is used. Examples of the elastic polymer include butyl rubber, isoprene rubber, silicone rubber, fluororubber, ethylene-propylene rubber, and chlorosulfonated polyethylene rubber (such as Hypalon™ rubber). The sealing body may contain one or two or more kinds of elastic polymers.

Although the elastic polymer has high sealing properties, the elastic polymer does not have sufficient heat resistance. That is, the elastic polymer is oxidized and deteriorated in a high-temperature environment to be brittle, so that the sealing function of the sealing body is deteriorated. The electrolytic capacitor is supposed to be used in a high-temperature environment such as in an engine room of a vehicle (an automobile or the like) or near the engine room. In the electrolytic capacitor including the liquid component, when the liquid component has high affinity for the elastic polymer, the elastic polymer is easily swollen by the liquid component. The elastic polymer swollen by the liquid component is more easily deteriorated in a high-temperature environment. According to the present disclosure, by using the above-described liquid component, deterioration of the elastic polymer contained in the sealing body can be effectively suppressed, and an electrolytic capacitor excellent in heat resistance is obtained.

The proportion of the elastic polymer in the sealing body is, for example, 10 mass % or more, and may be 20 mass % or more. When the proportion of the elastic polymer is in such a range, the sealing body is likely to deteriorate in a high-temperature environment. Even in such a case, deterioration of the elastic polymer can be suppressed by using the above-described liquid component, and high heat resistance of the electrolytic capacitor can be secured. From the easily securing the strength of the sealing body, the proportion of the elastic polymer is preferably 50 mass % or less or 40 mass % or less. When the elastic polymer is crosslinked with a crosslinking agent, the proportion of the elastic polymer is a proportion of the elastic polymer including the crosslinking agent.

The elastic polymer constituting the sealing body is usually crosslinked with a crosslinking agent. In particular, an electrolytic capacitor including a sealing body that contains an elastic polymer crosslinked with at least one crosslinking agent selected from the group consisting of a phenolic resin (such as an alkylphenolic resin oligomer) and a peroxide (such as an organic peroxide) is suitable for use applications requiring particularly high heat resistance. Even in the case of using such a sealing body, when a conventional liquid component in the related art is used, deterioration of the sealing body cannot be suppressed due to swelling of the liquid component in a high-temperature environment in some cases. According to the present disclosure, since the above-described liquid component is used, even in the case of using such a sealing body that is assumed to be used in a high-temperature environment, deterioration of the sealing body can be suppressed, and high heat resistance can be secured.

The additive may include, for example, at least one selected from the group consisting of a reinforcing agent (carbon or the like such as carbon black), an antioxidant, an antiaging agent, a crosslinking agent, a cross-linking promoter, a dispersion aid, a modifier, a vulcanizing agent, a vulcanization aid, and a processing aid.

The electrolytic capacitor has high heat resistance, and use of the electrolytic capacitor can be ensured in a high-temperature environment. For example, use of the electrolytic capacitor can be ensured at a temperature of 120° C. (or 150° C.) for 2000 hours or longer. The electrolytic capacitor is also suitable for use applications in an engine room of a vehicle or in the vicinity thereof where high durability and heat resistance are required.

The present disclosure also includes an electrolytic capacitor module including a plurality of the electrolytic capacitors as described above. The electrolytic capacitor module may include a plurality of the electrolytic capacitors connected in parallel. When a current of 20 A or more is applied to entire module of an electrolytic capacitor module in which a plurality of electrolytic capacitors in the related art are connected in parallel, the temperature of each electrolytic capacitor is increased to 100° C. or higher (sometimes, 120° C. or higher or 150° C. or higher) due to the ESR of each electrolytic capacitor, and thus the electrolytic capacitor cannot be used. In some cases, a large current of 50 A or more or 100 A or more may be applied to the entire module. Since the electrolytic capacitor of the present disclosure is excellent in heat resistance, a plurality of the electrolytic capacitors are connected in parallel to constitute an electrolytic capacitor module, so that use of the electrolytic capacitor can be ensured for a long period of time (specifically, 1000 hours or longer, preferably 1500 hours or longer, and more preferably 2000 hours or longer) even when a current of 20 A or more (or 50 A or more or 100 A or more) is applied to the entire module. The allowable current of the entire electrolytic capacitor module as described above may be 20 A or more, or may be 50 A or more or 100 A or more.

Figure 1:
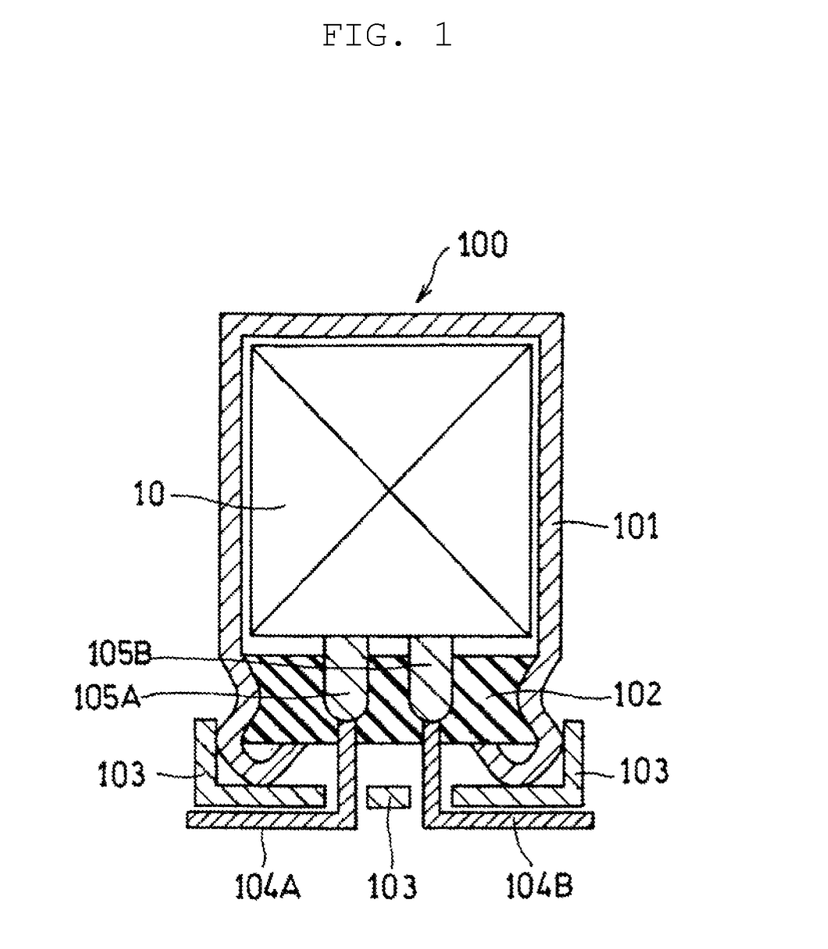
FIG. 1 is a schematic cross-sectional view illustrating an electrolytic capacitor according to an exemplary embodiment of the present disclosure.
Figure 2:
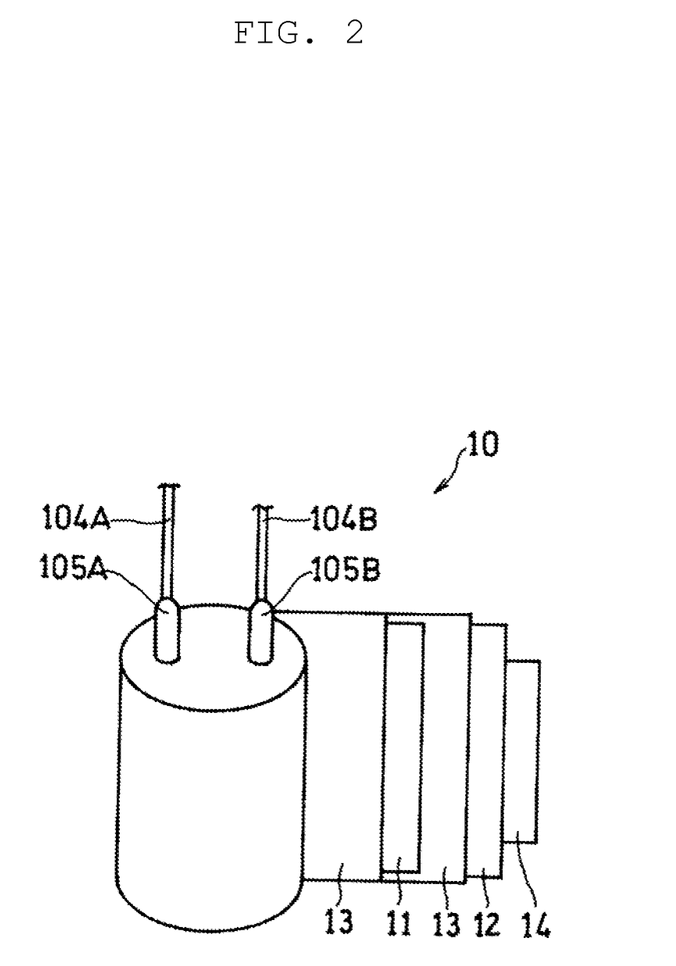
FIG. 2 is a schematic view illustrating a partially developed capacitor element of the electrolytic capacitor of FIG. 1.

FIG. 1 is a schematic cross-sectional view illustrating an electrolytic capacitor according to the present exemplary embodiment, and FIG. 2 is a schematic view illustrating a partially developed capacitor element of the electrolytic capacitor.

The electrolytic capacitor includes, for example, capacitor element 10, bottomed case 101 that houses capacitor element 10 and a liquid component (not illustrated), sealing body 102 that closes an opening of bottomed case 101, seat plate 103 that covers sealing body 102, lead wires 104A, 104B led out from sealing body 102 and penetrating seat plate 103, and lead tabs 105A, 105B connecting the lead wires and the electrodes of capacitor element 10. The vicinity of an opening end of bottomed case 101 is drawn inward, and the opening end is curled to swage sealing body 102.

Capacitor element 10 is, for example, a wound body as illustrated in FIG. 2. The wound body includes anode body 11 connected to lead tab 105A, cathode body 12 connected to lead tab 105B, and separator 13. A conductive polymer layer (not illustrated) is formed on anode body 11. At least the conductive polymer layer of capacitor element 10 is impregnated with the liquid component.

Anode body 11 and cathode body 12 are wound with separator 13 interposed between anode body 11 and cathode body 12. The outermost circumference of the wound body is fixed with winding stop tape 14. FIG. 2 illustrates a state in which a part of the wound body is developed before the outermost circumference of the wound body is stopped.

The electrolytic capacitor may have at least one capacitor element, and may have a plurality of capacitor elements. The number of capacitor elements included in the electrolytic capacitor may be determined in accordance with use applications.

[Method for Manufacturing Electrolytic Capacitor]

The electrolytic capacitor is manufactured by a manufacturing method including at least a step of preparing the above-described liquid component, a conductive polymer impregnating step of impregnating a dielectric layer with a conductive polymer, and a liquid component impregnating step of impregnating a capacitor element with the liquid component after the conductive polymer impregnating step. The method for manufacturing an electrolytic capacitor may include a step of adjusting the viscosity of the liquid component before the liquid component impregnating step. The method for manufacturing an electrolytic capacitor may further include a step of preparing a capacitor element and a step of sealing the capacitor element.

Hereinafter, an example of the method for manufacturing an electrolytic capacitor will be described.

(1) Step of Preparing Capacitor Element 10

(i) Step of Preparing Anode Body 11 Having Dielectric Layer and Cathode Body 12

A metal foil made of a valve metal is used as a raw material for anode body 11 and cathode body 12. In the case of anode body 11, a surface of the metal foil is roughened by an etching process or the like, so that a plurality of recesses and projections are formed on the surface of the metal foil. Next, a dielectric layer is formed on the roughened surface of the metal foil by an anodizing treatment or the like. As necessary, the surface of cathode body 12 may be roughened.

(ii) Preparation of Wound Body

Anode body 11 and cathode body 12 are wound with separator 13 interposed between anode body 11 and cathode body 12 to prepare a wound body. Winding stop tape 14 is disposed on an outer surface of cathode body 12 positioned on an outermost layer of the wound body to fix an end of cathode body 12. As necessary, the anodizing treatment is further performed on the wound body.

(iii) Step of Forming Capacitor Element 10

Capacitor element 10 can be formed by impregnating a dielectric layer with a conductive polymer (conductive polymer impregnating step). For example, a dielectric layer is impregnated with a liquid of the conductive polymer dispersion so that a conductive polymer film is formed to cover at least a part of the dielectric layer. Consequently, capacitor element 10 in which the conductive polymer is disposed between anode body 11 and cathode body 12 is obtained. The step of applying the polymer dispersion on the surface of the dielectric layer may be repeated two or more times.

The conductive polymer dispersion contains, for example, a conductive polymer and a liquid medium in which the conductive polymer is dispersed. Examples of the liquid medium include water, an organic liquid medium, and a mixture thereof. The conductive polymer dispersion may further contain at least one of a dopant and an additive, as necessary.

When the conductive polymer dispersion contains the sugar alcohol component, the dispersion hardly penetrates into the dielectric layer, and the dielectric layer is hardly impregnated with the conductive polymer. Hence, it is preferable that the conductive polymer dispersion does not contain the sugar alcohol component.

(2) Step of Preparing Liquid Component

The liquid component can be prepared by mixing constituents of the liquid component. Although the sugar alcohol component has low solubility to the non-aqueous solvent, a liquid component in which the sugar alcohol component is uniformly dissolved can be prepared by using the sugar alcohol component in combination with the polyalkylene glycol component. This step may be performed before the liquid component impregnating step, may be performed before or after the preparation of the capacitor element, or may be performed while the capacitor element is prepared.

More specifically, this step may include a step of dissolving the sugar alcohol component in the polyalkylene glycol component. When the sugar alcohol component and the polyalkylene glycol component are heated to a temperature higher than the melting point of these components and a temperature less than or equal to the boiling point or decomposition temperature of these components, the sugar alcohol component can be dissolved in the polyalkylene glycol component. When the liquid component includes other components (such as a solute and another non-aqueous solvent), the other components may coexist at the stage of dissolving the sugar alcohol component. Once the sugar alcohol component is dissolved in the polyalkylene glycol component, the sugar alcohol component is hardly precipitated even when the sugar alcohol component is cooled. Thus, when the liquid component includes other components, the other components can also be mixed after the sugar alcohol component is dissolved in the polyalkylene glycol component by heating and then cooled.

The heating temperature ranges, for example, from 30° C. to 200° C., inclusive, and may range from 50° C. to 100° C., inclusive.

(3) Step of Adjusting Viscosity of Liquid Component

The viscosity of the liquid component may be adjusted before the liquid component impregnating step. The viscosity of the liquid component can be adjusted, for example, by adjusting the temperature of the liquid component. More specifically, the viscosity may be adjusted by heating the liquid component. This step may be performed in the step of preparing a liquid component. More specifically, a liquid component may be prepared under heating, and capacitor element 10 may be impregnated with the liquid component in a state where the viscosity of the liquid component is reduced.

Through this step, the viscosity of the liquid component to be used for impregnation is set to preferably less than 200 mPa s, and more preferably 100 mPa s or less or 70 mPa s or less. When the sugar alcohol component is used in combination with the polyalkylene glycol component, the viscosity of the liquid component can be adjusted in such a range by heating. Thus, the conductive polymer of the capacitor element can be easily impregnated with the liquid component, high film restoration properties of the dielectric layer is easily secured, and high conductivity can be easily secured by the conductive polymer being oriented.

The temperature of the liquid component to be subjected to impregnation may range, for example, from 10° C. to 120° C., inclusive, or may range from 20° C. to 100° C., inclusive or from 20° C. to 70° C., inclusive. By heating the liquid component, the temperature of the liquid component to be subjected to impregnation may be adjusted to a temperature from 50° C. to 120° C., inclusive, from 50° C. to 100° C., inclusive, or from 50° C. to 70° C., inclusive.

(4) Liquid Component Impregnating Step

In this step, capacitor element 10 is impregnated with the liquid component. It is thus possible to achieve an electrolytic capacitor including the conductive polymer and the liquid component. Capacitor element 10 may be impregnated with the liquid component, for example, by housing capacitor element 10 and the liquid component in the container, by immersing capacitor element 10 in the liquid component, or by adding the liquid component dropwise to capacitor element 10.

(5) Step of Sealing Capacitor Element

Capacitor element 10 is housed in bottomed case 101 so that lead wires 104A, 104B are positioned on an opening side of the bottomed case 101. The liquid component is also housed in bottomed case 101. Next, the opening of bottomed case 101 is closed by sealing body 102 through which the respective lead wires pass, an opening end of bottomed case 101 is curled to swage sealing body 102, and seat plate 103 is disposed on a curled part. In this way, the electrolytic capacitor as illustrated in FIG. 1 is completed.

Although the winding-type electrolytic capacitor has been described in the above exemplary embodiment, the scope of application of the present disclosure is not limited to the above. The present disclosure can also be applied to other electrolytic capacitors including, for example, a chip-type electrolytic capacitor using a sintered metal body as an anode body and a laminated-type electrolytic capacitor using a metal plate as an anode body.

Examples

Hereinafter, the present disclosure will be specifically described based on Examples and Comparative Examples. However, the present disclosure is not limited to the following Examples.

<<Production of Electrolytic Capacitors E1 to E16 and C1 to C4>>

A wound electrolytic capacitor (diameter of 10 mm×length (L) of 10 mm) having a rated voltage of 25 V and a rated capacitance of 330 g was produced. A specific method for manufacturing an electrolytic capacitor will be described below.

(Preparation of Anode Body)

An aluminum foil having a thickness of 100 μm was subjected to an etching treatment to roughen the surface of the aluminum foil. Then, a dielectric layer was formed on the surface of the aluminum foil by an anodizing treatment. The anodizing treatment was performed by immersing the aluminum foil in an ammonium adipate solution and applying a voltage of 180 V to the aluminum foil. Then, the aluminum foil was cut to prepare an anode body.

(Preparation of Cathode Body)

An aluminum foil having a thickness of 50 μm was subjected to an etching treatment to roughen the surface of the aluminum foil. Then, the aluminum foil was cut to prepare a cathode body.

(Production of Wound Body)

An anode lead tab and a cathode lead tab were connected to the anode body and the cathode body, respectively, and the anode body and the cathode body were wound with a separator interposed between the anode body and the cathode body while the lead tabs were rolled in the anode body, the cathode body, and the separator. An anode lead wire and a cathode lead wire were connected to the ends of the lead tabs protruding from the wound body, respectively. The produced wound body was subjected to an anodizing treatment again to form a dielectric layer on the cutting end of the anode body. Next, the end of the outer surface of the wound body was fixed with a winding stop tape to produce a wound body.

(Preparation of Polymer Dispersion)

A mixed solution was prepared by dissolving, in ion-exchanged water, 3,4-ethylenedioxythiophene and polystyrene sulfonic acid (PSS, weight average molecular weight:

100000) that is a polymer dopant. While the mixed solution was being stirred, iron(III) sulfate (oxidant) dissolved in ion-exchanged water was added to perform a polymerization reaction. After the reaction, the obtained reaction solution was dialyzed to remove the unreacted monomer and excess oxidant, so that a polymer dispersion containing polyethylene dioxythiophene doped with about 5 mass % of PSS (PEDOT/PSS) was obtained.

(Formation of Solid Electrolyte Layer)

The wound body was immersed in the polymer dispersion housed in a predetermined container for 5 minutes in a reduced pressure atmosphere (40 kPa), and then the wound body was pulled out from the polymer dispersion. Next, the wound body impregnated with the polymer dispersion was dried in a drying furnace at 150° C. for 20 minutes to form a solid electrolyte layer made of a conductive polymer layer covering at least a part of the dielectric layer. In this way, a capacitor element was formed.

(Preparation of Liquid Component)

The sugar alcohol component shown in Table 1 and the polyalkylene glycol component were mixed, and the mixture was heated to 95° C. under stirring to dissolve the sugar alcohol component. To the obtained mixed solvent, triethylamine phthalate was added and mixed as the solute to have a concentration of 15 mass %. In this way, a liquid component was prepared.

In electrolytic capacitors C1 to C4, non-aqueous solvents shown in Table 1 were used as the liquid component.

(Assembling of Electrolytic Capacitor)

The liquid component was heated to 60° C. or higher to adjust the viscosity to less than 200 mPa s. In a case, 200 mg of the liquid component with the adjusted viscosity was housed together with the capacitor element, and the capacitor element was impregnated with the liquid component in a reduced pressure atmosphere (40 kPa) over 5 minutes. The opening of the case was sealed using the sealing body to complete an electrolytic capacitor as illustrated in FIG. 1. Then, an aging treatment was performed at 130° C. for 2 hours while a rated voltage was being applied. The viscosity of the liquid component was measured using a vibration type viscometer VM-100A manufactured by CBC Co., Ltd.

As the sealing body, a disk-shaped elastic member containing butyl rubber obtained by kneading a butyl polymer, a peroxide-based crosslinking agent, an additive and molding these materials using a mold was used. As the additive, a reinforcing agent (carbon black), a cross-linking promoter, a dispersion aid (stearic acid), a hindered phenol-based antiaging agent, and a modifier (silane coupling agent) were used. The amount of each component used was adjusted so that the content of butyl rubber as the elastic polymer component in the sealing body was the value in Table 1.

[Evaluation 1]

(Measurement of ESR and Residual Amount of Liquid Component)

The ESR (initial ESR) at a frequency of 100 kHz/Ω of the obtained electrolytic capacitor was measured using an LCR meter. To evaluate long-term reliability, each of the resultant electrolytic capacitors was held at 145° C. for 2000 hours while applying the rated voltage to each of the resultant electrolytic capacitors. An increase rate of ESR (ΔESR) was then checked. ΔESR was represented by the ratio ($Z/Z_0 \times 100\%$) of ESR(Z) of the electrolytic capacitor after retention at 145° C. to the initial value ($Z_0$). ESR(Z) was measured in the same manner as in the initial ESR using the electrolytic capacitor after retention at 145° C.

The electrolytic capacitor after the ratio of increase in ESR was confirmed was decomposed, and the liquid component was recovered to determine the mass (g). The residual amount of the liquid component was represented by the ratio ($m/m_0 \times 100\%$) of the mass (m) of the liquid component after retention at 145° C. to the initial mass ($m_0$) of the liquid component.

The evaluation results are shown in Table 1.

TABLE 1

| | Liquid component | | | | | | Sealing body | Evaluation | |
| --- | --- | --- | --- | --- | --- | --- | --- | --- | --- |
| | Sugar alcohol component | | PAG component | | | Non-aqueous solvent | | Content of elastic | ESR change | Residual ratio of liquid |
| | First sugar alcohol | Content (mass %) | PAG | Mw | Content (mass %) | Type | Content (mass %) | polymer (mass %) | ratio (%) | component (%) |
| E1 | Erythritol | 10 | PEG | 300 | 90 | — | 0 | 30 | 45 | 91 |
| E2 | Erythritol | 20 | PEG | 300 | 80 | — | 0 | 30 | 42 | 93 |
| E3 | Erythritol | 30 | PEG | 300 | 70 | — | 0 | 30 | 36 | 97 |
| E4 | Erythritol | 30 | PEG | 300 | 50 | EG | 20 | 30 | 43 | 85 |
| E5 | Erythritol | 30 | PEG | 300 | 50 | SL | 20 | 30 | 48 | 78 |
| E6 | Erythritol | 30 | PEG | 200 | 70 | — | 0 | 30 | 35 | 93 |
| E7 | Erythritol | 30 | PEG | 600 | 70 | — | 0 | 30 | 37 | 98 |
| E8 | Erythritol | 30 | PEG | 2000 | 70 | — | 0 | 30 | 37 | 98 |
| E9 | Erythritol | 30 | PPG | 400 | 70 | — | 0 | 30 | 40 | 96 |
| E10 | Erythritol | 30 | PPG | 1000 | 70 | — | 0 | 30 | 41 | 97 |
| E11 | Pentaerythritol | 30 | PEG | 300 | 70 | — | 0 | 30 | 32 | 98 |
| E12 | Mannitol | 30 | PEG | 300 | 70 | — | 0 | 30 | 34 | 97 |
| E13 | Xylitol | 30 | PEG | 300 | 70 | — | 0 | 30 | 34 | 97 |
| E14 | Erythritol | 30 | PEG | 300 | 70 | — | 0 | 10 | 33 | 98 |
| E15 | Erythritol | 30 | PEG | 300 | 70 | — | 0 | 30 | 36 | 97 |
| E16 | Erythritol | 30 | PEG | 300 | 70 | — | 0 | 50 | 40 | 91 |

TABLE 1-continued

| | Liquid component | | | | | | Sealing body | Evaluation | |
| --- | --- | --- | --- | --- | --- | --- | --- | --- | --- |
| | Sugar alcohol component | PAG component | | | Non-aqueous solvent | | Content of elastic | ESR change | Residual ratio of liquid |
| | First sugar alcohol | Content (mass %) | PAG | Mw | Content (mass %) | Type | Content (mass %) | polymer (mass %) | ratio (%) | component (%) |
| C1 | — | 0 | — | — | 0 | GBL | 100 | 30 | 345 | 42 |
| C2 | — | 0 | — | — | 0 | EG | 100 | 30 | 210 | 56 |
| C3 | — | 0 | — | — | 0 | GBL | 100 | 50 | 443 | 35 |
| C4 | — | 0 | — | — | 0 | EG | 100 | 50 | 307 | 44 |

PAG: polyalkylene glycol
PEG: polyethylene glycol
PPG: polypropylene glycol
GBL: γ-butyrolactone
EG: ethylene glycol
SL: sulfolane The electrolytic capacitor of the present disclosure can be used as a hybrid electrolytic capacitor. The electrolytic capacitor is particularly suitable for use applications requiring high heat resistance. However, the use application of the electrolytic capacitor is not limited to these use applications.

What is claimed is:

1. An electrolytic capacitor comprising:
   a capacitor element; and
   a liquid component,
   wherein:
   the capacitor element includes an anode body that includes a dielectric layer on a surface of the anode body, and a conductive polymer that covers a part of the dielectric layer,
   the conductive polymer is impregnated with the liquid component,
   the liquid component includes a sugar alcohol component and a polyalkylene glycol component,
   the sugar alcohol component contains at least one selected from the group consisting of a sugar alcohol having four or more hydroxy groups and a derivative of the sugar alcohol,
   a content proportion of the sugar alcohol component in the liquid component ranges from 5 mass % to 30 mass %, inclusive,
   a content proportion of the polyalkylene glycol component in the liquid component ranges from 50 mass % to 95 mass %, inclusive, and
   in the liquid component, a ratio of the content proportion of the sugar alcohol component to the content proportion of the polyalkylene glycol component is more than or equal to 0.25 and less than 0.6.

2. The electrolytic capacitor according to claim 1, wherein the sugar alcohol component contains at least one selected from the group consisting of mannitol, sorbitol, erythritol, pentaerythritol, a derivative of mannitol, a derivative of sorbitol, a derivative of erythritol, and a derivative of pentaerythritol.

3. The electrolytic capacitor according to claim 2, wherein the sugar alcohol component contains at least one selected from the group consisting of erythritol, pentaerythritol, a derivative of erythritol, and a derivative of pentaerythritol.

4. The electrolytic capacitor according to claim 1, wherein a weight average molecular weight of the polyalkylene glycol component ranges from 200 to 2000, inclusive.

5. The electrolytic capacitor according to claim 1, wherein the liquid component includes a solute at a concentration of 0.5 mass % or more.

6. The electrolytic capacitor according to claim 1, wherein the liquid component has a viscosity at 20° C. of 200 mPa's or more.

7. The electrolytic capacitor according to claim 1, further comprising:
   a container housing the capacitor element and the liquid component, the container having an opening; and
   a sealing body that seals the opening,
   wherein:
   the sealing body contains an elastic polymer, and
   a proportion of the elastic polymer in the sealing body is 10 mass % or more.

8. The electrolytic capacitor according to claim 7, wherein the elastic polymer is crosslinked with at least one crosslinking agent selected from the group consisting of a phenolic resin and a peroxide.

9. The electrolytic capacitor according to claim 1, wherein use of the electrolytic capacitor is ensured at a temperature of 120° C. for 2000 hours or longer.

10. An electrolytic capacitor module comprising a plurality of electrolytic capacitors which are connected in parallel, the plurality of electrolytic capacitors including the electrolytic capacitor according to claim 1.

11. The electrolytic capacitor module according to claim 10, wherein an allowable current of the electrolytic capacitor module is 20 A or more.

12. The electrolytic capacitor according to claim 1, wherein the liquid component further includes a tritol or a derivative of the tritol that is different from the sugar alcohol component.

13. The electrolytic capacitor according to claim 12, wherein the tritol is glycerin.

* * * * *